(12) United States Patent
Ravi et al.

(10) Patent No.: US 10,087,356 B2
(45) Date of Patent: Oct. 2, 2018

(54) OIL-IN-WATER STABLE, EMULSIFIED SPACER FLUIDS

(71) Applicant: Halliburton Energy Services, Inc., Houston, TX (US)

(72) Inventors: Krishna Ravi, Kingwood, TX (US); Sam Lewis, Spring, TX (US); Kyriacos Agapiou, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 22 days.

(21) Appl. No.: 14/890,849

(22) PCT Filed: Sep. 19, 2013

(86) PCT No.: PCT/US2013/060551
§ 371 (c)(1),
(2) Date: Nov. 12, 2015

(87) PCT Pub. No.: WO2015/041649
PCT Pub. Date: Mar. 26, 2015

(65) Prior Publication Data
US 2016/0090523 A1    Mar. 31, 2016

(51) Int. Cl.
*C09K 8/40* (2006.01)
*C09K 8/26* (2006.01)
(Continued)

(52) U.S. Cl.
CPC .................. *C09K 8/40* (2013.01); *C09K 8/26* (2013.01); *E21B 21/08* (2013.01); *E21B 33/14* (2013.01)

(58) Field of Classification Search
CPC .................................. C09K 8/40; C09K 8/424
See application file for complete search history.

(56) References Cited

U.S. PATENT DOCUMENTS 4,223,732 A * 9/1980 Carriay .................. C09K 8/424
166/291
8,148,303 B2 4/2012 Van Zanten et al.
(Continued)

OTHER PUBLICATIONS

SPE 156313 MIcroemulsion Technology for Synthetic-Based Mud Removal in Well Cementing Operations, 2012.
(Continued)

*Primary Examiner* — Angela M DiTrani
*Assistant Examiner* — Andrew Sue-Ako
(74) *Attorney, Agent, or Firm* — McDermott Will & Emery LLP

(57) ABSTRACT

Some embodiments described herein provide a method comprising method comprising providing an oil-in-water emulsified spacer fluid comprising a binary surfactant mixture, solvent non-aqueous base fluid, and an aqueous base fluid, wherein the binary surfactant mixture comprises a surfactant and an amphiphilic co-surfactant, wherein the surfactant is present in an amount in the range of from about 0.5% to about 30% by weight of the oil-in-water emulsified spacer fluid and wherein the amphiphilic co-surfactant is present in an amount in the range of from about 0.5% to about 30% by weight of the oil-in-water emulsified spacer fluid, and introducing the oil-in-water emulsified spacer fluid into a subterranean formation comprising a residual non-aqueous fluid therein, wherein the binary surfactant mixture in the oil-in-water emulsified spacer fluid emulsifies at least a portion of the residual non-aqueous fluid.

12 Claims, 1 Drawing Sheet

(51) Int. Cl.
E21B 21/08 (2006.01)
E21B 33/14 (2006.01)

(56) References Cited

U.S. PATENT DOCUMENTS

| | | |
|---|---|---|
| 8,375,773 B2 | 2/2013 | Lunkad et al. |
| 8,415,279 B2 | 4/2013 | Quintero et al. |
| 2001/0042622 A1 | 11/2001 | Chan |
| 2006/0096758 A1* | 5/2006 | Berry ............... C09K 8/40 166/291 |
| 2008/0274918 A1 | 11/2008 | Quintero et al. |
| 2010/0263863 A1* | 10/2010 | Quintero ............ C09K 8/40 166/267 |
| 2011/0021386 A1 | 1/2011 | Ali et al. |
| 2012/0004146 A1* | 1/2012 | Van Zanten ........... C09K 8/12 507/103 |
| 2012/0241155 A1 | 9/2012 | Ali et al. |

OTHER PUBLICATIONS

Van Zanten et al., "Successful Field Applications of Surfactant Nanotechnology to Displace Oil-Based Drilling Fluids for Completion Operations," AADE-11-NTCE-1, 2011.
H07940—"CFS™ -45 Micro-Emulsion Casing Cleaner for Coil Tubing Cleanout," 2010.
International Search Report and Written Opinion for PCT/US2013/060551 dated Jun. 12, 2014.

* cited by examiner

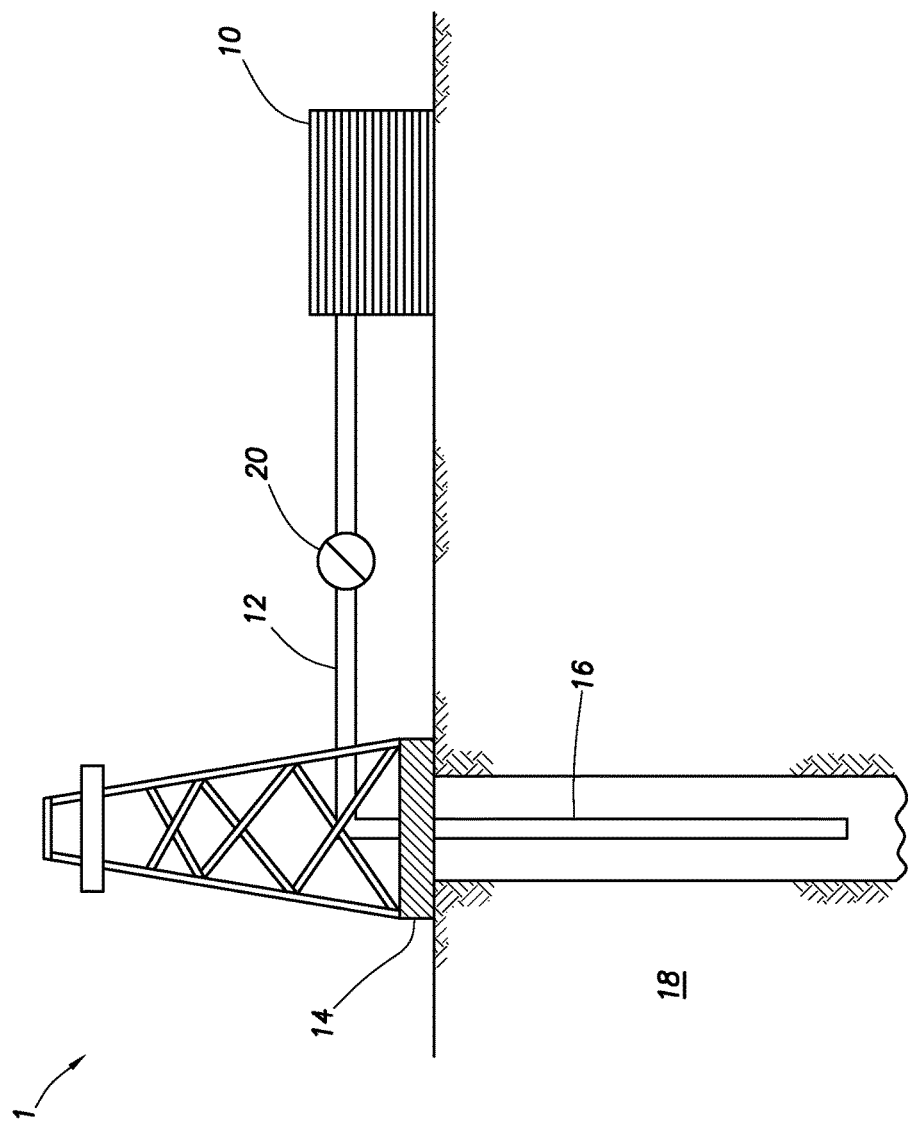

OIL-IN-WATER STABLE, EMULSIFIED SPACER FLUIDS

BACKGROUND

The embodiments herein relate to oil-in-water stable, emulsified spacer fluids for use in subterranean operations.

Subterranean operations (e.g., stimulation operations, sand control operations, completion operations, etc.) often involve placing a cement column around a casing (or liner) string in a wellbore. The cement column is formed by pumping a cement slurry through the bottom of the casing and out through an annulus between the outer casing wall and the formation face of the wellbore. The cement slurry develops into a gel and then cures in the annular space, thereby forming a column of hardened cement that, inter alia, supports and positions the casing in the wellbore and bonds the exterior surface of the casing to the subterranean formation. Among other things, the cement column may keep fresh water zones from becoming contaminated with produced fluids from within the wellbore. The cement column may also prevent unstable formations from caving in, thereby reducing the chance of a stuck drill pipe or a casing collapse. Additionally, the cement column forms a solid barrier to prevent fluid loss or contamination of production zones. The degree of success of subterranean operation involving placement of a cement column depends, therefore, at least in part, upon the successful cementing of the wellbore casing.

In order to effectively cement wellbore casing, adequate displacement of treatment fluids previously introduced into the wellbore (collectively referred to herein as "pre-cement treatment fluids"), particularly those comprising natural or synthetic oils (e.g., drilling fluids), is essential. This is because many pre-cement treatment fluids, particularly oleaginous fluids, tend to be incompatible with the cement curing processes. For this reason, adequate displacement of pre-cement treatment fluids is essential to achieve strong bonding between the cement and the subterranean formation and the cement and the casing (i.e., in the annulus between the outer casing wall and the formation face), to realize proper zonal isolation, structural integrity of the cement column, and the like. Traditionally, optimal removal of pre-cement treatment fluids prior to a cementing operation employs the use of spacer fluids formulated to have specific properties (e.g., plastic viscosity, yield point, density, and the like) depending on downhole requirements. As used herein, the term "spacer fluid" and all of its variants (e.g., "spacer") refers to any fluid used to physically separate one fluid from another.

Generally, surfactant additives are included in spacer fluids as cleaning agents to both aid in displacing the pre-cement treatment fluids and to water-wet the face of the subterranean formation and/or the casing. As used herein, the term "water-wet" refers to disposition of a film of aqueous fluid (e.g., water) coating on a surface (e.g., the face of a subterranean formation or the surface of casing). Surfactants alone may poorly emulsify and/or excessively foam, thereby decreasing the effectiveness of the surfactant to remove a pre-cement treatment fluid. Surfactants may additionally remain in the subterranean formation where they contaminate the cement in cementing operations, often interfering with the mechanical properties of the cement and, thus, a cement column's integrity. That is, while surfactants are useful in removing pre-cement treatment fluids and in preparing the surfaces, they may be detrimental to the cement if left behind, particularly in large quantities.

BRIEF DESCRIPTION OF THE DRAWINGS

The following figures are included to illustrate certain aspects of the embodiments disclosed herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the oil-in-water emulsified spacer fluids of the embodiments described herein to a downhole location.

DETAILED DESCRIPTION

The embodiments herein relate to oil-in-water stable, emulsified spacer fluids for use in subterranean operations. Specifically, the embodiments disclosed herein relate to micro-, mini-, and macro-stable emulsified spacer fluids comprising a binary surfactant mixture, a non-aqueous base fluid, and an aqueous base fluid. The binary surfactant mixture may comprise lipophilic and/or hydrophilic domains that may be capable of emulsifying, or incorporating, non-aqueous fluids into the emulsified spacer fluid. Thus, the emulsified spacer fluid may be used to remove at least a portion of a non-aqueous fluid from a subterranean formation.

The binary surfactant mixture of the emulsified spacer fluids may also increase the water wettability of a subterranean formation. As used herein, the term "water wettability" and all of its variants (e.g., "water wet") refers to adhesion of an aqueous fluid to the surface of a subterranean formation. The productivity of hydrocarbon producing subterranean formations, for example, may be improved if the formation is water wet, as a thin film of aqueous fluid may coat the surface of the formation and increase oil transport efficiency.

The emulsified spacer fluids described herein are stable emulsions. As used herein, the term "stable emulsion" and all of its variants refers to an emulsion having droplets that do not generally coalesce (i.e., combine to form larger droplets), flocculate (i.e., aggregate together), or cream (i.e., rise to the top of the emulsion) at a particular temperature and/or pressure. As used herein, the term "droplet" refers to an isolated fluid phase having a specific shape, which may be any shape including, but not limited to, a cylindrical shape, a spherical shape, a tubular shape, an irregular shape, and the like, and any combination thereof. Thus, the oil-in-water emulsified spacer fluids described herein may be characterized as having relatively evenly dispersed droplets therein.

The oil-in-water emulsified spacer fluids disclosed herein may comprise a binary surfactant mixture, a non-aqueous base fluid, and an aqueous base fluid, forming a three-phase micro-, mini-, and macro-stable emulsion. Such three-phase emulsions may form a Winsor emulsion. There are four general Winsor-type emulsions. In a Winsor-type I emulsion, the surfactant or binary surfactant mixture, such as that disclosed herein, forms an oil-in-water emulsion in the aqueous base fluid phase. In a Winsor-type II emulsion, the surfactant or binary surfactant mixture, as described in some embodiments herein, forms a water-in-oil emulsion in the non-aqueous base fluid phase. In a Winsor-type III emulsion, the surfactant or binary surfactant mixture, as described herein, forms an emulsion in a separate phase between the aqueous base fluid phase and the non-aqueous base fluid phase. Finally, in Winsor-type IV emulsion, the surfactant or binary surfactant mixture, such as that disclosed herein, the aqueous-based fluid, and the non-aqueous based fluid are equally solubilized, such that a single-phase emulsion is formed.

The oil-in-water emulsified spacer fluids described herein may be characterized thermodynamically stable, optically transparent or translucent, dilutable in aqueous base fluids, as defined herein, capable of increasing water wettability of surfaces, and emulsifying, or incorporating therein, non-aqueous fluids. In addition, the oil-in-water emulsified spacer fluids may have a relatively low viscosity, increasing the pumping efficiency during subterranean operations.

Although some embodiments described herein are illustrated by reference to cementing operations in subterranean formations, the emulsified spacer fluids may be used in any subterranean operation that may benefit from having non-aqueous fluids removed therefrom and/or increased water wettability. Such treatment operations may include, but are not limited to, a drilling operation; a lost circulation operation; a stimulation operation; an acidizing operation; an acid-fracturing operation; a sand control operation; a completion operation; a scale inhibiting operation; a water-blocking operation; a clay stabilizer operation; a fracturing operation; a frac-packing operation; a gravel packing operation; a wellbore strengthening operation; a sag control operation; and any combination thereof. Moreover, the emulsified spacer fluids described herein may be used in any non-subterranean operation that may benefit from its non-aqueous fluid removal and/or water wetting qualities. Such operations may be performed in any industry including, but not limited to, oil and gas, mining, chemical, pulp and paper, converting, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, business-related, government-related, and other constraints, which vary by implementation and from time to time. While a developer's efforts might be mixture and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, an oil-in-water emulsified spacer fluid is described herein comprising a binary surfactant mixture, a non-aqueous base fluid, and an aqueous base fluid. In some embodiments, a method of treating a subterranean formation is provided comprising introducing the oil-in-water emulsified spacer fluid into the subterranean formation, wherein the binary surfactant mixture emulsifies, or incorporates, at least a portion of residual non-aqueous fluid within the subterranean formation. As such, removal of the oil-in-water emulsified spacer fluid from the subterranean formation also removes at least a portion of the residual non-aqueous fluid within the subterranean formation. In some embodiments, the oil-in-water emulsified spacer fluid may be introduced after a wellbore is drilled into the subterranean formation, removed, and then followed by a cementing operation comprising introducing a casing string into the subterranean formation and introducing a cement composition into the subterranean formation so as to form a cement column in an annulus between the subterranean formation and the casing string.

The binary surfactant mixture in the oil-in-water emulsified spacer fluids disclosed herein may comprise a surfactant and an amphiphilic co-surfactant. The surfactant may be used to form an interfacial film on the non-aqueous base fluid dispersed phase in the emulsified spacer fluid and the co-surfactant may be used to ensure flexibility of the interfacial film, thus reducing interfacial tension and aiding the stability of the emulsion. Additionally, the binary surfactant mixture is capable of increasing the water wettability of a subterranean formation and other surfaces that contact the emulsified spacer fluid.

Suitable surfactants for use in the binary surfactant mixture may include, but are not limited to, anionic surfactant; a cationic surfactant; a zwitterionic surfactant; and any combination thereof. Specific examples of suitable surfactants may include, but are not limited to, a betaine; a sulfated alkoxylate; a sulfonated alkoxylate; an alkyl quaternary amine; an alkoxylated linear alcohol; an alkyl sulfonate; an alkyl aryl sulfonate; $C_{10}$-$C_{20}$ alkyldiphenyl ether sulfonate; a polyethylene glycol; an ether of alkylated phenol; a sodium dodecylsulfate; an alpha olefin sulfonate (e.g., sodium dodecane sulfonate, trimethyl hexadecyl ammonium bromide, and the like); an arginine methyl ester; an alkanolamine; an alkylenediamide; an alkyl ester sulfonate; an alkyl ether sulfonate; an alkyl ether sulfate; an alkali metal alkyl sulfate; a sulfosuccinate; an alkyl disulfonate; an alky aryl disulfonate; an alkyl disulfate; an alcohol polypropoxylated sulfate; an alcohol polyethoxylated sulfate; a taurate; an amine oxide; an alkylamine oxides; an ethoxylated amide; an alkoxylated fatty acid; an alkoxylated alcohol; an ethoxylated fatty amine; an ethoxylated alkyl amine; an alkylaminobetaine; a quaternary ammonium compound; any derivative thereof; and any combination thereof.

Suitable amphiphilic co-surfactants for use in the embodiments disclosed herein may include, but are not limited to, an alcohol; an alkyl alcohol; an aliphatic alcohol; an alicyclic alcohol; an unsaturated aliphatic alcohol; an unsaturated alicyclic alcohol; a polyhydric alcohol; an aromatic alcohol; an ethoxylated alcohol; a propoxylated alcohol; a glycol; a glycol ether; a polyglycol amine; a phenol; an ethoxylated phenol; a propoxylated phenol; and any combination thereof. Specific examples of suitable amphiphilic co-surfactants include, but are not limited to, methanol; ethanol; n-propanol; isopropanol; n-butanol; sec-butanol; isobutanol; t-butanol; benzyl alcohol; cyclohexanol; 2-ethyl hexanol; amine ethyl ethanolamine; cyclohexylamine; diethanolamine; diethylamine; diethylenetriamine; diethylethanolamine; di-isopropanolamine; di-isopropylamine; dimethylethanolamine; ethylene diamine; isopropylamine; monoethanolamine; monoisopropanolamine; morpholine; triethanolamine; triethylamine; tri-isopropanolamine; diethylene glycol; dipropylene glycol; ethylene glycol; polyethylene glycol; tripropylene glycol; triethylene glycol; propylene glycol; polypropylene glycol; polyglycol; hexylene glycol; glycerine; nonylphenol; nonylphenol ethoxylate; nonylphenol polyethylene; nonylphenol polyethylene ether; nonylphenoxy poly(ethyleneoxy)ethanol; tertiary-butyl alcohol; any derivative thereof; and any combination thereof.

In some embodiments, the surfactant may be present in an amount in the range of from a lower limit of about 0.5%, 1%, 2.5%, 5%, 7.5%, and 10%, 12.5%, and 15% to an upper limit of about 30%, 27.5%, 25%, 22.5%, 20%, 17.5%, and 15% by weight of the emulsified spacer fluid and the amphiphilic co-surfactant may be present in an amount in the range of from a lower limit of about 0.5%, 1%, 2.5%, 5%, 7.5%, 10%, 12.5%, and 15% to an upper limit of about 30%, 27.5%, 25%, 22.5%, 20%, 17.5%, and 15% by weight of the emulsified spacer fluid having no additives included therein. In some embodiments, the surfactant to amphiphilic co-surfactant ratio may be in the range of from an upper limit of about 3:1, 2.8:1, 2.6:1, 2.4:1, 2.2:1, and 2:1 to a lower limit of about 1:1, 1.2:1, 1.4:1, 1.6:1, 1.8:1, and 2:1. In exemplary embodiments, the surfactant to amphiphilic co-surfactant ratio may be 2:1.

The oil-in-water emulsified spacer fluids described herein may be a micro-, mini-, or macro-stable emulsion. As used herein, the term "microemulsion" refers to a stable, isotropic emulsion comprising dispersed phase droplets with an average diameter in the range of from a lower limit of about 1 nm, 10 nm, 20 nm, 30 nm, 40 nm, and 50 nm to an upper limit of about 100 nm, 90 nm, 80 nm, 70 nm, 60 nm, and 50 nm. In some embodiments, the dispersed phase droplets in the microemulsion have an average diameter in the range of from a lower limit of about 10 nm, 12.5 nm, 15 nm, 17.5 nm, 20 nm, 22.5 nm, 25 nm, 27.5 nm, and 30 nm to an upper limit of about 50 nm, 47.5 nm, 45 nm, 42.5 nm, 40 nm, 37.5 nm, 35 nm, 32.5 nm, and 30 nm. As used herein, the term "miniemulsion" refers to a stable emulsion comprising dispersed phase droplets with an average diameter in the range of from a lower limit of about 50 nm, 100 nm, 150 nm, 200 nm, 250 nm, 300 nm, 350 nm, 400 nm, 450 nm, and 500 nm to an upper limit of about 1 μm, 950 nm, 900 nm, 850 nm, 800 nm, 750 nm, 700 nm, 650 nm, 600 nm, 550 nm, and 500 nm. As used herein, the term "macroemulsion" refers to a stable emulsion having comprising dispersed phase droplets with an average diameter of greater than about 0.1 μm. In some embodiments, the macroemulsion comprises dispersed phase droplets having an average diameter in the range of from a lower limit of about 1 μm, 5 μm, 10 μm, 15 μm, 20 μm, 25 μm, 30 μm, 35 μm, 40 μm, 45 μm, and 50 μm to an upper limit of about 100 μm, 95 μm, 90 μm, 85 μm, 80 μm, 75 μm, 70 μm, 65 μm, 60 μm, 55 μm, and 50 μm. In exemplary embodiments, where oil-in-water emulsified spacer fluids disclosed herein are macroemulsions, a low-molecular weight surfactant is selected for use in the binary surfactant mixture so as to prevent or reduce any coalescence of the dispersed phase droplets. Additionally, the macroemulsion may be further stabilized by Pickering stabilization, characterized by included in the oil-in-water emulsified spacer fluid inert solids that are capable of adsorbing onto the interface between the dispersed phase droplets and the continuous phase (e.g., silica, carbon black, barium sulfate, calcium carbonate, clay, and the like).

The non-aqueous base fluid in the oil-in-water emulsified spacer fluids may be any water-insoluble liquid that is capable of forming a stable emulsion with the aqueous base fluids and binary surfactant mixtures disclosed herein. Suitable non-aqueous base fluids may include, but are not limited to, an alkane; a cyclic alkane; an olefin; an aromatic organic compound; an aliphatic organic compound; a paraffin; a diesel; a mineral oil; a synthetic oil; a desulfurized hydrogenated kerosene; and any combination thereof. In some embodiments, the non-aqueous base fluid may be present in the oil-in-water emulsified spacer fluids in an amount in the range of from a lower limit of about 1%, 2.5%, 5%, 7.5%, 10%, 12.5%, 15%, 17.5%, 20%, 22.5%, 25%, 27.5%, and 30% to an upper limit of about 60%, 57.5%, 55%, 52.5%, 50%, 47.5%, 45%, 42.5%, 40%, 37.5%, 35%, 32.5%, and 30% by weight of the emulsified spacer fluid having no additives included therein.

The aqueous base fluid for use in the oil-in-water emulsified spacer fluids may include, but is not limited to, fresh water; saltwater (e.g., water containing one or more salts dissolved therein); brine (e.g., saturated salt water); seawater; and any combination thereof. Generally, the aqueous base fluid may be from any source, provided that it does not contain components that may adversely affect the stability and/or performance of the oil-in-water emulsified spacer fluids described herein. In some embodiments, the aqueous base fluid may be present in the oil-in-water emulsified spacer fluids in an amount in the range of from a lower limit of about 40%, 42.5%, 45%, 47.5%, 50%, 52.7%, 55%, 57.5%, 60%, 62.5%, 65%, 67.5%, and 70% to an upper limit of about 98%, 95%, 92.5%, 90%, 87.5%, 85%, 82.5%, 80%, 77.5%, 75%, 72.5%, and 70% by weight of the emulsified spacer fluid having no additives included therein.

In some embodiments, the oil-in-water emulsified spacer fluids may further comprise an additive so as to improve the stability of the emulsion, render the emulsified spacer fluid more effective at performing a particular subterranean operation, to effectively address certain qualities of the subterranean formation (e.g., permeability, propensity for fines formation, and the like), and the like. Suitable additives that may be used in the oil-in-water emulsified spacer fluids described herein include, but are not limited to, a salt; a weighting agent; an inert solid; a fluid loss control agent; an emulsifier; a dispersion aid; a corrosion inhibitor; an emulsion thinner; an emulsion thickener; a viscosifying agent; a gelling agent; a proppant; a lost circulation agent; a foaming agent; a gas; a pH control additive; a breaker; a biocide; a crosslinker; a stabilizer; a chelating agent; a scale inhibitor; a gas hydrate inhibitor; an oxidizer; a reducer; a friction reducer; a clay stabilizing agent; and any combination thereof.

In various embodiments, systems configured for delivering the oil-in-water emulsified spacer fluids described herein to a downhole location are described. In various embodiments, the systems can comprise a pump fluidly coupled to a tubular, the tubular containing the oil-in-water emulsified spacer fluids.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the oil-in-water emulsified spacer fluids to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the oil-in-water emulsified spacer fluids to the high pressure pump. In such embodiments, the low pressure pump may "step up" the pressure of the oil-in-water emulsified spacer fluid before it reaches the high pressure pump.

In some embodiments, the systems described herein can further comprise a mixing tank that is upstream of the pump and in which the oil-in-water emulsified spacer fluid is formulated. In various embodiments, the pump (e.g., a low pressure pump, a high pressure pump, or a combination thereof) may convey the oil-in-water emulsified spacer fluid from the mixing tank or other source of the oil-in-water emulsified spacer fluid to the tubular. In other embodiments, however, the oil-in-water emulsified spacer fluid can be formulated offsite and transported to a worksite, in which case the oil-in-water emulsified spacer fluid may be introduced to the tubular via the pump directly from its shipping container (e.g., a truck, a railcar, a barge, or the like) or from a transport pipeline. In either case, the oil-in-water emulsified spacer fluid may be drawn into the pump, elevated to an appropriate pressure, and then introduced into the tubular for delivery downhole.

FIG. 1 shows an illustrative schematic of a system that can deliver oil-in-water emulsified spacer fluids of the embodiments described herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which an oil-in-water emulsified spacer fluid of the embodiments disclosed herein may be formulated. The oil-in-water emulsified spacer fluid may be conveyed via line 12 to wellhead 14, where the oil-in-water emulsified spacer fluid enters tubular 16, tubular 16 extending from wellhead 14 into subterranean formation 18. Upon being ejected from tubular 16, the oil-in-water emulsified spacer fluid may subsequently penetrate into subterranean formation 18. Pump 20 may be configured to raise the pressure of the oil-in-water emulsified spacer fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the oil-in-water emulsified spacer fluid may, in some embodiments, flow back to wellhead 14 and exit subterranean formation 18. In some embodiments, the oil-in-water emulsified spacer fluid that has flowed back to wellhead 14 may subsequently be recovered and recirculated to subterranean formation 18.

It is also to be recognized that the disclosed oil-in-water emulsified spacer fluids may also directly or indirectly affect the various downhole equipment and tools that may come into contact with the oil-in-water emulsified spacer fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: providing an oil-in-water emulsified spacer fluid comprising a binary surfactant mixture, solvent non-aqueous base fluid, and an aqueous base fluid, wherein the binary surfactant mixture comprises a surfactant and an amphiphilic co-surfactant, wherein the surfactant is present in an amount in the range of from about 0.5% to about 30% by weight of the oil-in-water emulsified spacer fluid and wherein the amphiphilic co-surfactant is present in an amount in the range of from about 0.5% to about 30% by weight of the oil-in-water emulsified spacer fluid, and wherein the amphiphilic co-surfactant is selected from the group consisting of an alcohol; an alkyl alcohol; an aliphatic alcohol; an alicyclic alcohol; an unsaturated aliphatic alcohol; an unsaturated alicyclic alcohol; a polyhydric alcohol; an aromatic alcohol; an ethoxylated alcohol; a propoxylated alcohol; a glycol; a glycol ether; a polyglycol amine; a phenol; an ethoxylated phenol; a propoxylated phenol; and any combination thereof; and introducing the oil-in-water emulsified spacer fluid into a subterranean formation comprising a residual non-aqueous fluid therein, wherein the binary surfactant mixture in the oil-in-water emulsified spacer fluid emulsifies at least a portion of the residual non-aqueous fluid.

B. An oil-in-water emulsified spacer fluid comprising: a binary surfactant mixture, solvent non-aqueous base fluid, and an aqueous base fluid, wherein the binary surfactant mixture comprises a surfactant and an amphiphilic co-surfactant, wherein the surfactant is present in an amount in the range of from about 0.5% to about 30% by weight of the emulsified spacer fluid and wherein the amphiphilic co-surfactant is present in an amount in the range of from about 0.5% to about 30% by weight of the emulsified spacer fluid, and wherein the amphiphilic co-surfactant is selected from the group consisting of an alcohol; an alkyl alcohol; an aliphatic alcohol; an alicyclic alcohol; an unsaturated aliphatic alcohol; an unsaturated alicyclic alcohol; a polyhydric alcohol; an aromatic alcohol; an ethoxylated alcohol; a propoxylated alcohol; a glycol; a glycol ether; a polyglycol amine; a phenol; an ethoxylated phenol; a propoxylated phenol; and any combination thereof.

Each of embodiments A and B may have one or more of the following additional elements in any combination:

Element 1: Wherein the binary surfactant mixture increases the water wettability of the subterranean formation.

Element 2: Wherein oil-in-water emulsified spacer fluid is a microemulsion comprising dispersed phase droplets having an average diameter in the range of from about 1 nm to about 100 nm.

Element 3: Wherein the oil-in-water emulsified spacer fluid is a miniemulsion comprising dispersed phase droplets having an average diameter in the range of from about 50 nm to about 1 μm.

Element 4: Wherein the oil-in-water emulsified spacer fluid is a macroemulsion comprising dispersed phase droplets having an average diameter in the range of from about 1 μm to about 100 μm.

Element 5: Wherein the surfactant is selected from the group consisting of an anionic surfactant; a cationic surfactant; a zwitterionic surfactant; and any combination thereof.

Element 6: Wherein the non-aqueous base fluid is selected from the group consisting of an alkane; a cyclic alkane; an olefin; an aromatic organic compound; an aliphatic organic compound; a paraffin; a diesel; a mineral oil; a synthetic oil; a desulfurized hydrogenated kerosene; and any combination thereof.

Element 7: Wherein the surfactant is selected from the group consisting of a betaine; a sulfated alkoxylate; a sulfonated alkoxylate; an alkyl quaternary amine; an alkoxylated linear alcohol; an alkyl sulfonate; an alkyl aryl sulfonate; $C_{10}$-$C_{20}$ alkyldiphenyl ether sulfonate; a polyethylene glycol; an ether of alkylated phenol; a sodium dodecylsulfate; an alpha olefin sulfonate; an arginine methyl ester; an alkanolamine; an alkylenediamide; an alkyl ester sulfonate; an alkyl ether sulfonate; an alkyl ether sulfate; an alkali metal alkyl sulfate; a sulfosuccinate; an alkyl disulfonate; an alky aryl disulfonate; an alkyl disulfate; an alcohol polypropoxylated sulfate; an alcohol polyethoxylated sulfate; a taurate; an amine oxide; an alkylamine oxides; an ethoxylated amide; an alkoxylated fatty acid; an alkoxylated alcohol; an ethoxylated fatty amine; an ethoxylated alkyl amine; an alkylaminobetaine; a quaternary ammonium compound; any derivative thereof; and any combination thereof.

Element 8: Wherein the emulsified spacer fluid further comprises an additive selected from the group consisting of a salt; a weighting agent; an inert solid; a fluid loss control agent; an emulsifier; a dispersion aid; a corrosion inhibitor; an emulsion thinner; an emulsion thickener; a viscosifying agent; a gelling agent; a proppant; a lost circulation agent; a foaming agent; a gas; a pH control additive; a breaker; a biocide; a crosslinker; a stabilizer; a chelating agent; a scale inhibitor; a gas hydrate inhibitor; an oxidizer; a reducer; a friction reducer; a clay stabilizing agent; and any combination thereof.

Element 9: Removing the oil-in-water emulsified spacer fluid from the subterranean formation; introducing a casing string into the subterranean formation; introducing a cement composition into the subterranean formation so as to form a cement column in an annulus between the subterranean formation and the casing string; and setting the cement composition forming the cement column.

Element 10: Wherein the binary surfactant mixture is capable of emulsifying at least a portion of a non-aqueous fluid.

By way of non-limiting example, exemplary combinations applicable to A and B include: A with 1, 3, and 6; A with 4, 7, and 9; B with 1, 2, and 8; and B with 5, 7, and 10.

To facilitate a better understanding of the embodiments described herein, the following examples of preferred or representative embodiments are given. In no way should the following examples be read to limit, or to define, the scope of the disclosure.

Example 1

In this example, the stability of the oil-in-water emulsified spacer fluids described herein comprising various amounts of solvent non-aqueous base fluid was evaluated. A 14-ppg non-emulsified control spacer fluid was prepared comprising 51.5% by weight of the control spacer fluid of barite (weighting agent) and 5% by weight of the control spacer fluid of a mixture comprising 25% by weight of betaine (surfactant) and 25% by weight of tertiary-butyl alcohol (co-surfactant) in fresh water (aqueous base fluid) to balance. Three experimental 14-ppg oil-in-water emulsified spacer fluids were prepared. The first oil-in-water emulsified spacer fluid (TF1) was prepared using 51.2% by weight of TF1 of barite (weighting agent), 5% by weight of TF1 of binary surfactant (as described above with reference to the control spacer fluid), 2% by weight of TF1 of synthetic paraffin (non-aqueous base fluid), and fresh water (aqueous base fluid) to balance. The second oil-in-water emulsified spacer fluid (TF2) was prepared identically to TF1, except that it comprised 52.2% by weight of TF2 of barite (weighting agent) and 4% by weight of TF2 of synthetic paraffin (non-aqueous base fluid). The third oil-in-water emulsified spacer fluid (TF3) was also prepared identically to TF1, except that it comprised 53.8% by weight of TF3 of barite (weighting agent) and 8% by weight of TF3 of synthetic paraffin (non-aqueous base fluid). The slight variation in barite between the control spacer fluid, TF1, TF2, and TF3 was a result of accommodating for the amounts of non-aqueous base fluid used in the fluids. To separate beakers, 100 ml of the control spacer fluid, TF1, TF2, and TF3 were added for stability testing and observation.

The control spacer fluid and the experimental emulsified spacer fluids TF1, TF2, and TF3 were visually observed for stability after 30 minutes. After 30 minutes, the control spacer fluid exhibited substantial settling and inhomogeneity. However, none of TF1, TF2, or TF3 exhibited any apparent settling and each remained a homogenous fluid.

The control spacer fluid and the experimental emulsified spacer fluids TF1, TF2, and TF3 were thereafter visually observed for stability after 60 minutes. After 60 minutes, the control spacer fluid exhibited continued settling as compared to the 30 minute observation. And again, none of TF1, TF2, or TF3 exhibited any apparent settling and each remained a homogeneous fluid.

The experimental emulsified spacer fluids TF1, TF2, and TF3 were finally observed after 48 hours and continued to remain stable fluids, with no apparent settling or inhomogeneity.

Example 2

In this example, the stability of conventional spacer fluids comprising conventional surfactants as compared to the oil-in-water emulsified spacer fluids of the embodiments described herein was evaluated. A 14 ppg non-emulsified control surfactant spacer fluid was prepared comprising 52.2% by weight of the control spacer fluid of barite (weighting agent), 4% by weight of the control spacer fluid of synthetic paraffin (non-aqueous base fluid), 5% by weight of control spacer fluid of nonylphenol ethoxylate (surfactant), and fresh water (aqueous base fluid) to balance. An experimental 14 ppg oil-in-water emulsified spacer fluid (TF4) was prepared in accordance with the embodiments described herein using 52.2% by weight of TF4 of barite (weighting agent), 5% by weight binary surfactant mixture (as described in Example 1), 4% by weight of TF4 of synthetic paraffin (non-aqueous base fluid), and fresh water (aqueous base fluid) to balance. To separate beakers, 100 ml of the control surfactant spacer fluid and TF4 were added for stability testing and observation.

The control surfactant spacer fluid and the experimental emulsified spacer fluid TF4 were visually observed for stability after 30 minutes. After 30 minutes, the control surfactant spacer fluid exhibited substantial settling and inhomogeneity. However, TF4 exhibited no apparent settling and remained a homogenous fluid.

The control surfactant spacer fluid and the experimental emulsified spacer fluid TF4 were thereafter visually observed for stability after 60 minutes. After 60 minutes, the control surfactant spacer fluid exhibited continued settling as compared to the 30 minute observation. And again, TF4 exhibited no apparent settling and remained a homogenous fluid.

Therefore, the embodiments herein well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A method comprising:
providing an oil-in-water emulsified spacer fluid comprising a binary surfactant mixture, solvent non-aqueous base fluid, a weighting agent, and an aqueous base fluid,
wherein the binary surfactant mixture comprises a surfactant and an amphiphilic co-surfactant in a ratio of surfactant to amphiphilic co-surfactant in the range of about 1:2 to 2:1,
wherein the surfactant is a betaine and is present in an amount in the range of from about 0.5% to about 5% by weight of the oil-in-water emulsified spacer fluid and wherein the amphiphilic co-surfactant is present in an amount in the range of from about 0.5% to about 5% by weight of the oil-in-water emulsified spacer fluid, and
wherein the amphiphilic co-surfactant is selected from the group consisting of an alcohol; an alkyl alcohol; an aliphatic alcohol; an alicyclic alcohol; an unsaturated aliphatic alcohol; an unsaturated alicyclic alcohol; a polyhydric alcohol; an aromatic alcohol; an ethoxylated alcohol; a propoxylated alcohol; a glycol; a glycol ether; a polyglycol amine; a phenol; an ethoxylated phenol; a propoxylated phenol; and any combination thereof;
wherein the non-aqueous fluid is a paraffin and the non-aqueous fluid is present in an amount in the range of about 1% to about 10% by weight of the oil-in-water emulsified spacer fluid,
wherein the weighting agent is in the amount of about 50% by weight to about 55% by weight of the oil-in-water emulsified spacer fluid, and
introducing the oil-in-water emulsified spacer fluid into a subterranean formation comprising a residual non-aqueous fluid therein,
wherein the binary surfactant mixture in the oil-in-water emulsified spacer fluid emulsifies at least a portion of the residual non-aqueous fluid; and
wherein the combination of betaine and amphiphilic co-surfactant in a ratio of surfactant to amphiphilic co-surfactant in the range of about 1:2 to 2:1 together with paraffin in the amount of about 1% to about 10% by weight of the oil-in-water emulsified spacer fluid is able to produce an emulsion having low surfactant content which remains stable against settling for a period of time greater than about 48 hours.

2. The method of claim 1, wherein the binary surfactant mixture increases the water wettability of the subterranean formation.

3. The method of claim 1, wherein oil-in-water emulsified spacer fluid is a microemulsion comprising dispersed phase droplets having an average diameter in the range of from about 1 nm to about 100 nm.

4. The method of claim 1, wherein the oil-in-water emulsified spacer fluid is a miniemulsion comprising dispersed phase droplets having an average diameter in the range of from about 50 nm to about 1 µm.

5. The method of claim 1, wherein the oil-in-water emulsified spacer fluid is a macroemulsion comprising dispersed phase droplets having an average diameter in the range of from about 1 µm to about 100 µm.

6. The method of claim 1, wherein the emulsified spacer fluid further comprises an additive selected from the group consisting of a salt; a weighting agent; an inert solid; a fluid loss control agent; an emulsifier; a dispersion aid; a corrosion inhibitor; an emulsion thinner; an emulsion thickener; a viscosifying agent; a gelling agent; a proppant; a lost circulation agent; a foaming agent; a gas; a pH control additive; a breaker; a biocide; a crosslinker; a stabilizer; a chelating agent; a scale inhibitor; a gas hydrate inhibitor; an oxidizer; a reducer; a friction reducer; a clay stabilizing agent; and any combination thereof.

7. The method of claim 1 further comprising:
removing the oil-in-water emulsified spacer fluid from the subterranean formation;
introducing a casing string into the subterranean formation;
introducing a cement composition into the subterranean formation so as to form a cement column in an annulus between the subterranean formation and the casing string; and
setting the cement composition forming the cement column.

8. The method of claim 7, wherein the aqueous base fluid in the oil-in-water emulsified spacer fluid is selected from the group consisting of fresh water; saltwater; brine; seawater; and any combination thereof.

9. The method of claim 7, wherein the aqueous base fluid in the oil-in-water emulsified spacer fluid is present in an amount in a range of about 40% to about 70% by weight of the emulsified spacer fluid.

10. The method of claim 7, wherein the amphiphilic co-surfactant is tertiary-butyl alcohol.

11. The method of claim 7, wherein the emulsion is a microemulsion.

12. A method comprising:
providing an oil-in-water emulsified spacer fluid comprising a binary surfactant mixture, solvent non-aqueous base fluid, a weighting agent, and an aqueous base fluid,
wherein the binary surfactant mixture comprises a surfactant and an amphiphilic co-surfactant in a ratio of surfactant to amphiphilic co-surfactant in the range of about 1:2 to 2:1,
wherein the surfactant is a betaine present in an amount in the range of from about 0.5% to about 5% by weight of the oil-in-water emulsified spacer fluid,
wherein the amphiphilic co-surfactant is tertiary-butyl alcohol present in an amount in the range of from about 0.5% to about 5% by weight of the oil-in-water emulsified spacer fluid,
wherein the non-aqueous fluid is a paraffin and the non-aqueous fluid is present in an amount in the range of about 1% to about 10% by weight of the oil-in-water emulsified spacer fluid,
wherein the weighting agent is in the amount of about 50% by weight to about 55% by weight of the oil-in-water emulsified spacer fluid,
wherein the emulsified spacer fluid further comprises an additive selected from the group consisting of a salt; a weighting agent; an inert solid; a fluid loss control agent; an emulsifier; a dispersion aid; a corrosion inhibitor; an emulsion thinner; an emulsion thickener; a viscosifying agent; a gelling agent; a proppant; a lost circulation agent; a foaming agent; a gas; a pH control additive; a breaker; a biocide; a crosslinker; a stabilizer; a chelating agent; a scale inhibitor; a gas hydrate inhibitor; an oxidizer; a reducer; a friction reducer; a clay stabilizing agent; and any combination thereof, and
introducing the oil-in-water emulsified spacer fluid into a subterranean formation comprising a residual non-aqueous fluid therein,
wherein the binary surfactant mixture in the oil-in-water emulsified spacer fluid emulsifies at least a portion of the residual non-aqueous fluid; and
wherein the combination of betaine and tertiary butyl alcohol in a ratio of surfactant to amphiphilic co-surfactant in the range of about 1:2 to 2:1 together with paraffin in the amount of about 1% to about 10% by weight of the oil-in-water emulsified spacer fluid is able to produce an emulsion having low surfactant content which remains stable against settling for a period of time greater than about 48 hours.

* * * * *